April 28, 1936.  H. S. JANDUS ET AL  2,039,004
AUXILIARY BUFFER CONSTRUCTION
Filed June 26, 1933  2 Sheets-Sheet 1
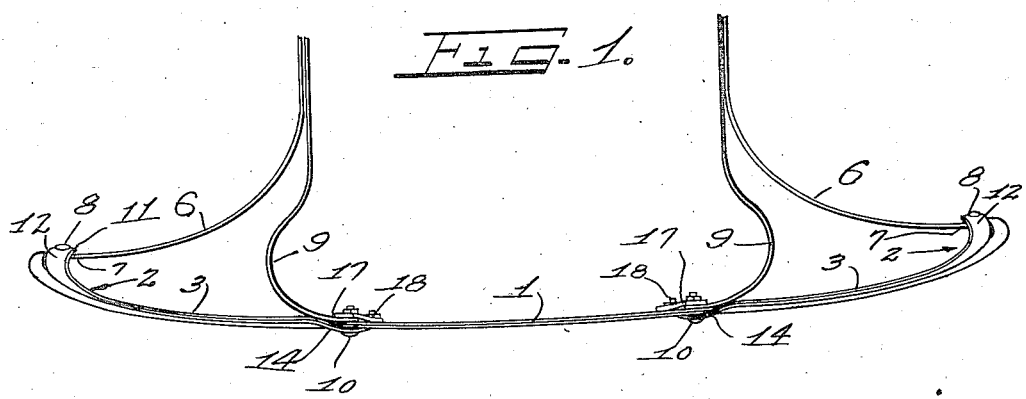
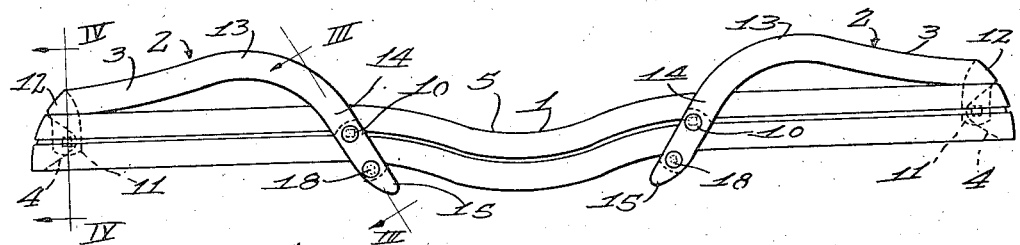
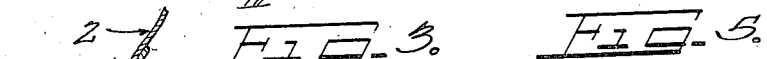
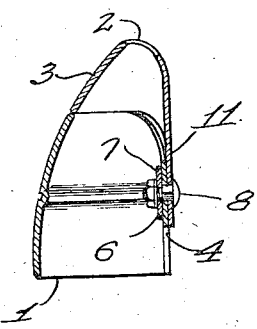
Inventor
HERBERT S. JANDUS,
HAROLD LEE BROOKE.

April 28, 1936.  H. S. JANDUS ET AL  2,039,004
AUXILIARY BUFFER CONSTRUCTION
Filed June 26, 1933  2 Sheets-Sheet 2
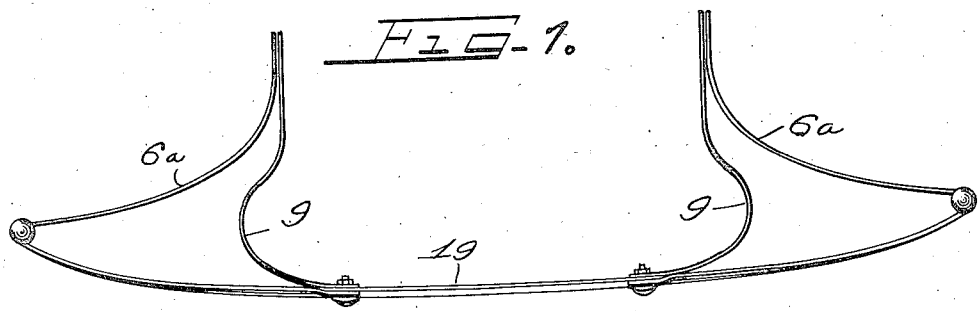
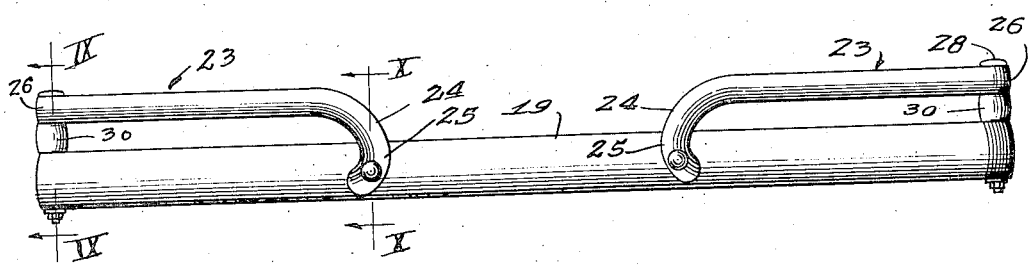
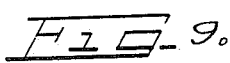  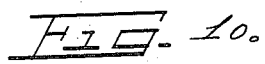
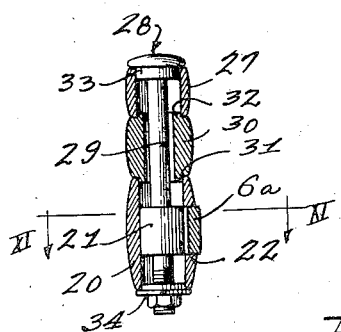  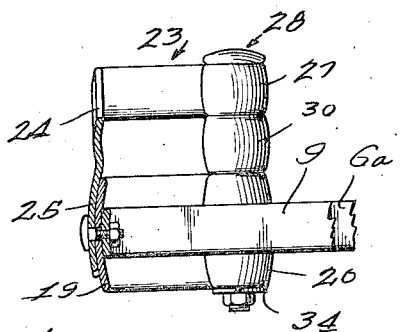
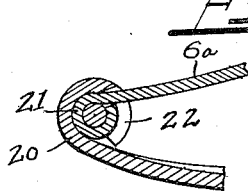
Inventors
HERBERT S. JANDUS,
HAROLD LEE BROOKE.

Patented Apr. 28, 1936

2,039,004

UNITED STATES PATENT OFFICE 2,039,004

AUXILIARY BUFFER CONSTRUCTION

Herbert S. Jandus and Harold Lee Brooke, Detroit, Mich., assignors to General Spring Bumper Corporation, Detroit, Mich., a corporation of Michigan Application June 26, 1933, Serial No. 677,582

8 Claims. (Cl. 293—55)

This invention has to do with bumper constructions and is concerned more particularly with a guard structure to be mounted on an impact bar of a bumper and to be employed in preventing the bumper impact bar and the impact structure of another car from overriding each other.

Due to the lack of standardization of the height of bumpers from the ground when secured to automobiles, as well as to the different sizes and types of tires employed on automobile wheels, it is a common occurrence for engaging impact bars of colliding cars to ride one over the other, resulting oftentimes in injury to adjacent vehicle lamps, radiator and other parts of the vehicle bodies, and in interlocked bumpers which are separated only with extreme difficulty.

Solutions of this problem have been attempted heretofore, but have involved constructions which have been expensive to manufacture, difficult to attach in place, fragile or embodied an undesirably large number of parts, or for other reasons have been found unsatisfactory.

It is accordingly an object of the present invention to provide a device comprising essentially a single member for attachment to a bumper adjacent each end thereof, and formed to substantially increase the effective vertical range through which a bumper of another car can move without interlocking with the first bumper.

It is another object of the invention to provide a spring bumper with guard means independent of the mounting means of the bumper to prevent interlocking of the bumper with another bumper.

A further object of the invention involves the provision of a metallic and preferably spring steel or similar auxiliary bumper or guard formed to be readily and easily secured to an impact bar in such a manner as to involve no change whatever in the bumper construction.

It is another object of the invention to provide an auxiliary bumper construction to be attached to a bumper in such a manner as not only to increase the effective vertical range of the bumper but to enhance the appearance thereof.

A further object of the invention consists in the provision of a bumper structure having portions from adjacent its center substantially to its ends of substantially increased vertical range to prevent overriding between the same and the bumper of another car at the ends as well as at intermediate portions of the bumper structure.

It is also one of the objects of the present invention to provide a bumper whose ends are rigidly connected to the support bars, with auxiliary guard means rigidly connected to the ends and intermediate portions of the bumper impact bar for preventing said bar from overriding or being overridden by the impact bar of the bumper of another car.

It is also an object of the present invention to provide an impact bar whose ends are pivotally supported, with auxiliary bumper elements pivotally connected to the ends of the impact bar and preferably rigidly connected to intermediate portions of the impact bar.

In carrying out the invention into practice in accordance with one form, there is provided adjacent each end of an impact bar of a bumper, an auxiliary bar one end of which is preferably although not necessarily connected to an end of the impact bar, which end is preferably but not necessarily bent rearwardly, the remainder of the auxiliary bar extending along and somewhat above the impact bar and then turned at an angle and crossing the bar with the extremity of the auxiliary member extending below the lower edge of the impact bar adjacent the center of the impact bar. Thus the auxiliary member extends appreciably above and below the upper and lower edges of the impact bar and this is also true of the auxiliary member at the other end, the portions of the auxiliary members adjacent the center of the impact bar extending preferably in front of the impact bar. Suitable means such as bolts, nuts and clamp plates are preferably employed in connecting the inner ends of the respective auxiliary members to the intermediate part of the impact bar, the outer ends of said members being preferably secured at the point at which the extremities of the impact bar are connected to the support bar structure. Likewise, the inner portions of the auxiliary bars are connected to the impact bar by the same means which serve to connect the intermediate portions of the impact bar to the supporting structure, so that in employing the auxiliary members, no modification in the structure of the impact bar or of the support bar structure is required.

In accordance with another form of the invention, the auxiliary members do not project below the lower edge of the impact bar and preferably have their inner ends positioned behind rather than in front of the impact bar as is true of the previously referred to construction.

In accordance with a still further form of the invention, the impact bar has its ends pivotally connected to the supporting bar structure, and the auxiliary members have their outer extremities pivotally connected by the same means which serves to pivotally connect the ends of the impact bar to the supporting structure. The auxiliary members of this form of the invention preferably though not necessarily extend in substantial parallelism with and above the impact bar, and the inner portions of the auxiliary bars preferably extend in front of but not below the impact bar and are attached thereto by the same means employed in attaching the adjacent portions of the impact bar to the back bar or supporting structure. If desired, the inner portions of this auxiliary construction may extend below the impact bar, and may be mounted behind instead of in front of the impact bar. With this form of the invention, moreover, the outer extremities of the auxiliary members are held in vertically spaced relation to the extremities of the impact bar.

The buffer plate or guard structure may be formed in different sectional shapes for use with bumpers of corresponding or other shapes, and may be formed to extend varying amounts above and/or below the impact bar, as the case may be.

Further important objects and advantages of the invention will appear as the description proceeds.

This invention (in preferred forms) is illustrated in the drawings and hereinafter more fully described.

On the drawings:

Figure 1 is a plan view of a bumper equipped with auxiliary guard means embodying the principles of the present invention in accordance with one form.

Figure 2 is an elevational view of the structure shown in Figure 1.

Figure 3 is a somewhat enlarged sectional view taken substantially in the plane designated by the line III—III in Figure 2.

Figure 4 is a sectional view, somewhat enlarged, taken substantially in the plane designated by the line IV—IV in Figure 2.

Figure 5 is a fragmentary elevational view of a somewhat modified form of the invention.

Figure 6 is an enlarged sectional view taken substantially in the plane designated by the line VI—VI in Figure 5.

Figure 7 is a plan view of another form of the invention.

Figure 8 is an elevational view of the construction shown in Figure 7.

Figure 9 is a sectional view taken substantially in the plane designated by the line IX—IX in Figure 8, certain parts being shown in elevation.

Figure 10 is a sectional view taken substantially in the plane designated by the line X—X in Figure 8, certain parts being shown in elevation.

Figure 11 is a fragmentary sectional view taken substantially in the plane designated by the line XI—XI in Figure 9.

As shown on the drawings:

Referring now more particularly to the drawings, a bumper which, for illustrative purposes only, is shown as embodying a single impact bar 1 of transversely arcuate form is equipped with a pair of auxiliary buffer or guard devices 2 constructed in accordance with the principles of one form of the present invention. It is to be understood that the bumper may be constructed to include either a single impact bar or a plurality of impact bars. For the purpose of explaining the present invention, the buffer plate or guard constructions are formed to accommodate or to be attached to the impact bar 1, but it is to be understood that the principles of the present invention may be retained even though the shapes of the particular impact bars in connection with which the buffer devices made in accordance with the present invention are used, may vary. For example, should it be desired to employ the present invention in connection with an impact bar which is of substantially rectilinear or any cross section other than the arcuate cross section shown in the drawings, it is to be understood that the buffer device portions associated directly or indirectly with the bumper bar may be correspondingly shaped.

Each auxiliary bumper construction 2 comprises a preferably elongated strip or bar 3 which may be made of spring steel or otherwise, and, in accordance with the form of the invention shown in Figures 1 to 4 inclusive, is arranged to extend horizontally from the extremity 4 at each end of the impact bar 1 to a point preferably somewhat spaced from the center of the bar 1, and vertically both above and below the respective upper and lower edges of the impact bar.

For the purpose of explaining the adaptability of the principles of the present invention to bumpers of different forms, the invention has been illustrated in connection with two somewhat different types of bumpers.

In the forms of the invention shown in Figures 1 to 6, inclusive, the bumper is formed with a slight dip or edge bend at 5 at its central portion, has an arcuate cross section and is formed with a longitudinal groove and corresponding rib, the extremities 4 being return bent. Suitable supporting structure is employed to attach the impact bar to the frame of the automobile chassis. This structure is here shown as comprising a pair of outwardly curved arms 6 whose outer extremities 7 are disposed forwardly of and are bolted at 8 to the extremities 4.

The supporting structure in accordance with the present illustration includes a second pair of bars 9 having their forward ends curved to lie behind the impact bar 1 in somewhat spaced relation to the dip 5 of the bar, and are bolted at 10 thereto.

Each auxiliary bar 3 is bent adjacent its outer extremity 11 along a line which may be arranged in substantial continuance with the end of the end contour of the impact bar for the purpose of harmonizing therewith as shown at 12, the extremity 11 being positioned back of the extremity 4 of the impact bar and secured thereto by the same bolt means 8 employed in securing the extremity 4 of the impact bar to the outer support arms 6.

The portion of the strip 3 extending inwardly and forwardly from the bend 12 has preferably the same general form in elevation as the adjacent portion of the impact bar for purposes of harmony, but extends somewhat upward from the impact bar as shown at 13, from which point the strip 3 extends downwardly at an angle to the vertical in front of the impact bar, following the transverse curvature thereof as shown in the sectional view in Figure 3 at 14, the inner extremity 15 projecting substantially below the lower edge of the impact bar as shown. The portion 13 extends a substantial distance above the upper edge of the impact bar, and the portion 13 together with the lower extremity 15 thereby serve to very materially and substantially increase the vertical range of the bumper structure to substantially prevent overriding between the bumper impact bar 1 and the impact bar of the bumper of another car.

The bolt means 10 serve to secure the intermediate portions of the impact bar 1 to the back or supporting bars 9. In order to provide a more rigid connection between the portion 14 of the bar 3 and the impact bar 1, a clamp plate or strap 17 and a second bolt means 18 are employed. The second bolt means 18, while passing through the downwardly projecting extremity 15 of each bar 3, is spaced from the bolt means 10 sufficiently so that it passes below rather than through the impact bar 1.

Of course the portion 14 of each bar 2 may extend at any desired angle with respect to the vertical, so long as portions 13 and 15 are provided to extend substantially above and below the impact bar 1 to function as intended. In connection with the particular bumper illustrated in Figures 1 and 2, it may be found desirable as illustrated to arrange the portions 14 so that they converge, the appearance resulting from this arrangement being in harmony with the dip 5 in the center portion of the bar, so that the bumper structure as a whole is not only attractive in itself but substantially improves the appearance of the vehicle in connection with which the same is used.

It is to be appreciated that while the portions 14 of the bars 2 are illustrated as positioned in front of the impact bar 1, the same may, if desired, be positioned behind the impact bar without departing from the principles of the invention.

In Figures 5 and 6, a modification of the auxiliary bar construction is illustrated. The bar 2a is in all respects identical with the bar 2 with the exception that its inner end portion 14a is not extended below the impact bar 1 and further that the portion 14a is located behind rather than in front of the impact bar. As a consequence of this construction, no clamp plate 17 and additional bolt means 18 are required.

In the form of the invention shown in Figures 7 to 11, inclusive, the impact bar 19 is longitudinally straight and transversely arcuate and has its ends coiled into rearwardly extending eyes 20 of generally barrel shape. Any suitable supporting structure may be employed such as the arms 6a and 9 corresponding with arms 6 and 9 in Figures 1 et seq., said arms extending rearwardly for securement to the automobile chassis frame. The forward end of each arm 6a is forwardly coiled into an eye 21 fitting through a slot 22 in each of the impact bar eyes 20, and fitting pivotally as shown in Figure 9.

The auxiliary guard construction in accordance with the form of the invention shown in Figures 7 to 10, inclusive, comprises a pair of bars which are preferably symmetrically arranged as in the previously described form of the invention, in conjunction with the impact bar 19. Each bar 23 is arranged throughout preferably the major portion of its length in substantial parallelism with the impact bar 19, the inner end portion 24 being gracefully curved downwardly toward and extending in front of the impact bar 19 as shown at 25 where it preferably follows the transverse curvature of the impact bar, as shown in Figure 10. The other extremity 26 of each bar 23 is return curled in the form of an eye 27 which is preferably cylindrical although it may be shaped otherwise if desired.

For the purpose of simplicity of construction, the eyes 20, 21 and 27 are secured in coaxial relationship by the same bolt means indicated at 28. The securing means 28 comprises an elongated bolt shank 29 extending through said eyes, the eyes 20 and 27 being spaced apart by means of a sleeve 30 which is formed with reduced guiding bosses 31 and 32 projecting respectively into the upper portion of the eye 20 and the lower portion of the eye 27 and holding the respective eyes in coaxial relation to the shank 29. The shank 29 has a shoulder 33 which fits the upper part of the eye 27, the latter having a diameter preferably substantially the same as the diameter of the eye 20 in order that they may be formed on the same mandrel. A similar shoulder is provided in conjunction with a washer element 34 for cooperating with the lower end of the eye 20, and a lock washer and nut are applied thereto on the threaded lower extremity of the shank 29 to hold the parts in proper assembled relation while permitting such relative pivotal movement between the parts as the conditions of use may require.

The bars 23 as well as the bars 2 and 2a previously described, are preferably of spring steel so that the same may yield and thus obviate the likelihood of breaking upon collision of bumpers of different automobiles.

While the portions 24 at the inner ends of the bars 23 are arranged in front of and do not extend below the impact bar 19, it is to be understood that these portions may extend to the rear of the impact bar and may also extend below the same to further increase the vertical range of the bumper structure as will be understood in connection with the form of the invention first above described and illustrated in Figures 1 to 4, inclusive.

The bars 23 may extend at an angle to the horizontal rather than extend in a horizontal direction as illustrated, and likewise the portions 24 at the inner ends thereof may be arranged differently as they project toward the impact bar 19, in accordance with the desire to modify the appearance of the bumper structure as a whole.

It will be observed that the auxiliary buffer construction embodying the various forms herein described is extremely simple, involving no reorganization whatever of the bumper in connection with which the same is used, may be arranged to very substantially improve the appearance of the bumper in connection with which the same is employed and of the vehicle also, and serves to adequately protect the bumper impact bar against being overridden by the impact bar of another car.

It will be observed that in each of the forms of the invention herein disclosed, the auxiliary bar extends from a point adjacent the center of the impact bar throughout the remainder of the length of the bar to the end. Thus protection against overriding is afforded throughout the major portion of the length of the impact bar without requiring the employment of an additional impact bar. That is, with the construction herein disclosed, a single impact bar is adequate protection for any motor vehicle, and since the function of the additional bars or guards is to merely augment the impact bar and not to take up the major impacts to which the impact bar may be subjected, said additional bars are preferably of lighter construction so that the weight of the bumper is not unduly increased.

By arranging the additional bars so that they extend over the impact bar throughout a substantial distance longitudinally of the impact bar, and from points adjacent the center of the bar to the ends thereof, the likelihood of overrunning between the end of the impact bar with the end of the impact bar of another car is obviated, since the additional bars are arranged to compensate for the lack of standardization in height of bumpers as explained hereinabove.

We are aware that many changes may be made and numerous details of construction may be varied through a wide range without departing from the principles of this invention, and we therefore do not purpose limiting the patent granted hereon otherwise than necessitated by the prior art.

We claim as our invention:

1. In a bumper construction comprising an impact bar and supporting bar structure including means for securing the supporting structure to the ends and intermediate portion of the impact bar, an auxiliary guard structure connected to said ends and intermediate portion of the impact bar by said securing means and extending in one direction vertically substantially beyond the impact bar from an intermediate part of the impact bar substantially to an extremity of the impact bar, and also extending in the opposite direction substantially vertically beyond the impact bar.

2. In a bumper construction comprising an impact bar and supporting bar structure including means for securing the supporting structure to the ends and intermediate portion of the impact bar, an auxiliary guard structure extending vertically beyond the impact bar and connected to said ends and intermediate portion of the impact bar by said securing means, the portion of the guard structure connected to the intermediate portion of the impact bar being positioned in front of and conforming to the front surface of the impact bar.

3. In a bumper construction comprising an impact bar and supporting bar structure including means for securing the supporting structure to the ends and intermediate portion of the impact bar, an auxiliary guard structure extending vertically beyond the impact bar and connected to said ends and intermediate portion of the impact bar by said securing means, a part of said impact bar being edge bent out of line with the remainder of the bar, and the intermediate portion of the guard structure being located adjacent the edge bent part and converging in the direction in which said part is bent.

4. In a bumper construction comprising an impact bar and supporting bar structure including means for securing the supporting structure to the ends and intermediate portion of the impact bar, an auxiliary guard structure extending vertically beyond the impact bar and connected to said ends and intermediate portion of the impact bar by said securing means, a part of said impact bar being edge bent downwardly out of line with the remainder of the bar, and the intermediate portion of the guard structure being located adjacent the edge bent portion and converging downwardly.

5. In a bumper construction comprising an impact bar and supporting bar structure including means for securing the supporting structure to the ends and intermediate portion of the impact bar, an auxiliary guard structure extending vertically beyond the impact bar and connected to said ends and intermediate portion of the impact bar by said securing means, said guard structure at said intermediate portion being positioned behind and shielded by the impact bar.

6. In a bumper construction comprising an impact bar and supporting bar structure including means for securing the supporting structure to the ends and intermediate portion of the impact bar, said supporting structure being shielded by said impact bar at said ends, an auxiliary guard structure extending vertically beyond the impact bar and connected to said ends and intermediate portion of the impact bar by said securing means, said means pivotally connecting said guard structure to the impact bar.

7. In a bumper construction comprising an impact bar and supporting bar structure including means for securing the supporting structure to the ends and intermediate portion of the impact bar, an auxiliary guard structure extending vertically beyond the impact bar and connected to said ends and intermediate portion of the impact bar by said securing means, said means pivotally connecting said auxiliary guard structure to the impact bar, and means for spacing apart the auxiliary guard structure and impact bar at the pivot.

8. In a bumper construction including an impact bar, an auxiliary guard structure comprising a pair of parts extending vertically beyond the impact bar, each of said parts being connected to an end and intermediate portion of the impact bar, the inner ends of the parts being positioned behind the impact bar.

HERBERT S. JANDUS.
HAROLD LEE BROOKE.